Patented Jan. 12, 1943

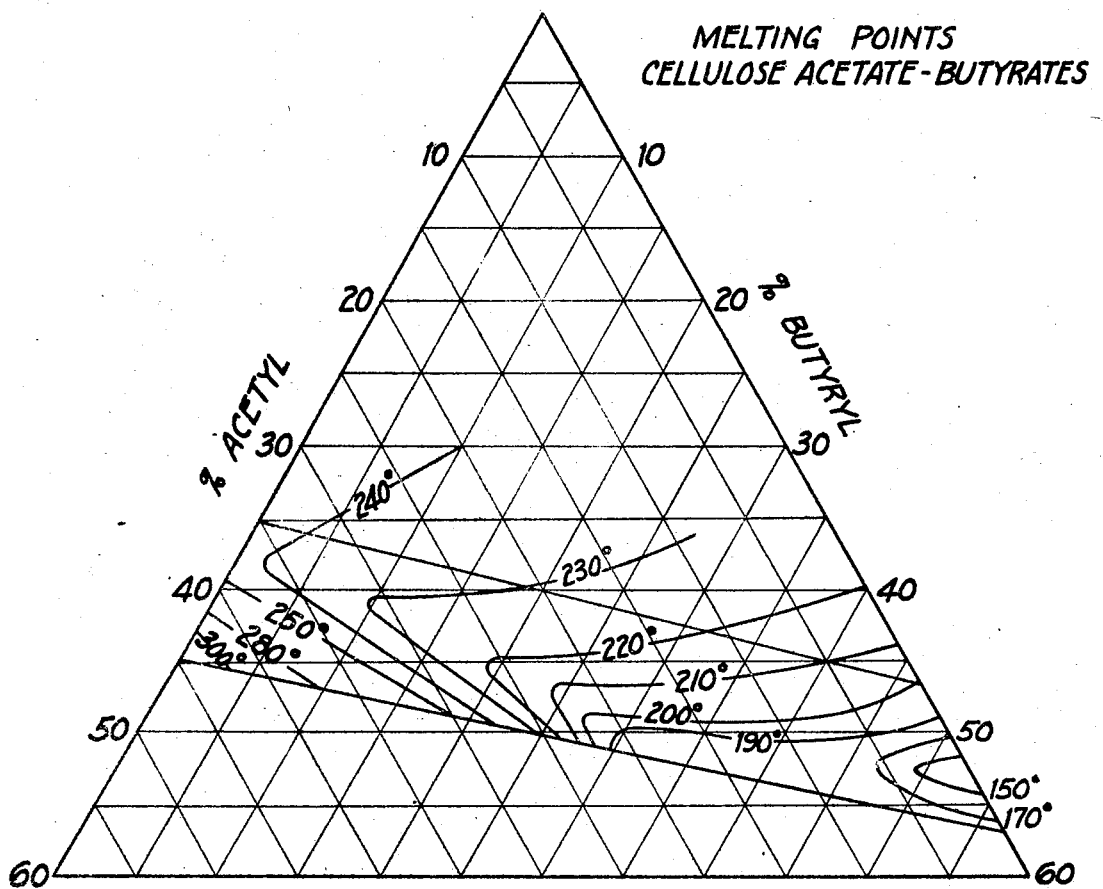

2,307,783

UNITED STATES PATENT OFFICE 2,307,783

METHOD OF COATING

Carl J. Malm and Gerard J. Clarke, Rochester, N. Y., assignors to Eastman Kodak Company, Rochester, N. Y., a corporation of New Jersey Application May 24, 1939, Serial No. 275,485

9 Claims. (Cl. 117—65)

This invention relates to the coating of objects with cellulose esters in which the coatings are melted on by subjecting the object, containing a layer of the ester, to a temperature which will melt but not deteriorate the ester.

The prior art recognizes that cellulose acetate melts at a high temperature whereby it is transformed into a dark-colored, smeary mass. In spite of this characteristic of cellulose acetate, attempts have been made to coat objects in which the ester is heat treated. These attempts have usually involved mixing a large amount of plasticizer with the cellulose ester so that the elevated temperature which is employed forms a solution of the cellulose ester in the plasticizer without being high enough to cause breakdown. The use of a considerable amount of plasticizer in such a composition is detrimental to adhesion, hence this method has found no appreciable application. It has also been suggested to mix a resin with cellulose acetate which, by treating with heat, melts and dissolves the cellulose ester. Where a resin has been employed, there is a tendency to brittleness and to discoloration in use and the melting operation may so affect the resin that the transparency of the coating is affected.

An object of our invention is to provide a coating method in which the cellulose ester is melted onto the surface which is to be coated. Another object of our invention is to provide a coating method giving a transparent coating which is free of holes or pores but which is firmly adherent to the surface to which it is applied. A further object of our method is to obtain a protective coating which is non-tacky, stable and of good appearance and which will adhere to surfaces even though there is a greasy or oily film thereon.

We have found that by our coating method, which is based upon the melting point of the cellulose ester, a firmly adhering, strong, non-tacky coating is obtained. We have found that if a layer of a stable cellulose ester, having a substantial content of fatty acid radicals of at least three carbon atoms and a difference between the melting point and charring point of the ester of at least 40° C. and preferably 70° C., is formed on a surface, such as by spraying or spreading a solvent solution of the ester thereon, and evaporating the solvent, and the layer is then heated to the melting point of the ester or sufficiently beyond to cause the layer to become soft and pasty without detrimentally affecting it and subsequently cooled, a strong bond is obtained between the object and the ester layer and a smooth, brilliant, non-tacky coating is obtained.

In previous coating methods in which heat treatments were employed, the processes were rather limited due to the charring tendency of the cellulose ester used and its non-resistance to the heat necessary for melting. To overcome this defect a large amount of a solvent was mixed with the cellulose ester and a calendering rather than a melting operation was used. We have found that the presence of large quantities of plasticizer or high boiling material mixed with a cellulose ester interferes with the adhesion in such a process.

In our coating methods it is preferred that the composition be substantially free of resins which either cause discoloration of the coating and interfere with transparency or result in a brittle coating or both. It is also preferred that the composition be free of plasticizer, although the use of some plasticizer does not affect the adhesion sufficiently to prevent its use to a small extent in most commercial applications. Our coating method is preferably carried out by first either dipping an object in a solution of the cellulose ester or by spraying or spreading a solvent solution of the ester on the surface of the object to be protected. Any of the volatile solvents, which will leave a thin layer on an object, will be used. For example, solvents, such as acetone, methyl ethyl ketone, methylene chloride, ethylene chloride or their mixture, either with or without a lower aliphatic alcohol, such as methyl or ethyl alcohol, benzene-alcohol and the like, providing they are solvents of the cellulose ester, are suitable for use. The dilution is optional, but ratios of 4:1 up to 10:1 of solvent to solid are ordinarily quite suitable. After the surface has been wet with the solution, the solvent is evaporated either by subjecting the surface to warm air or by allowing it to stand at room temperature for a sufficient time. The driving off of the solvent, prior to the application of heat for the melting operation, is preferred, although, if desired, driving off the solvent and causing the melting may be performed in one operation, such as by gradually increasing the degree of heat applied to the coated object.

After the solvent has evaporated but before the melting operation, a coating is present on the object which will readily peel off therefrom. To prevent this peeling and to assure a strongly adhering, firm, hard, protective coating, the object is subjected to a temperature above the melting point of the ester but at least 40° C. below its char point until the coating becomes soft and pasty. This melting operation usually takes but one or two minutes at a temperature of 20–30° C. above the melting point of the ester. With a temperature not much above the melting point of the ester, a little longer time is necessary, but with layers of the usual thickness, a time longer than four minutes is seldom, if ever, required.

We have found that a temperature of 230° C. is ordinarily quite suitable for the melting treatment. The temperature employed in our process will usually be found within the range of 200–250° C. depending, of course, upon the particular ester which is employed. The time is only limited as to length to that which will not detrimentally affect the cellulose ester which is used. After the coating has become soft or pasty, the object is allowed to cool and has a uniform, firm, transparent coating thereon. In the coating of objects, the use of a thin layer is preferred because of the rapidity with which it may be softened. For instance, a layer of approximately .001" thickness would ordinarily be very satisfactory. Because of the nature of our process, it is preferred that the layer be not more than .005" thick, although our invention is not limited as to the thickness of the protective coating applied.

The cellulose esters, which we have found to be most suitable for our invention, are cellulose acetate butyrates containing over 25% butyryl, cellulose acetate propionate butyrates containing over 30% of propionyl and butyryl, cellulose propionate butyrates, cellulose propionates and cellulose butyrates. The butyryl (and/or propionyl) can be replaced by higher acyl radicals, such as valeryl, caproyl or stearyl, but too great a content of acyl groups of more than 6 carbon atoms results in an undesirable softness and stretchiness in the coatings obtained. It is, therefore, desirable that the major portion of acyl of at least 3 carbon atoms should contain between 3 and 6 carbon atoms. If this acyl is of the type containing close to 10 carbon atoms, it is preferred that it be present only in small amount, such as not more than 10–20% of the total acyl of at least 3 carbon atoms.

The esters used in our process should preferably contain at least 20% of a fatty acid radical of above 3 carbon atoms and should contain sufficient higher acyl to assure a melting point of below 230° C. and be of sufficient stability to have a char point at least 40° C. above the melting point and preferably above 260° C. We prefer to use the fully esterified ester or one which has been only slightly hydrolyzed as the moisture resistance is higher, the melting point is usually lower and the resistance to actinic rays such as ultra-violet light is much better than in the case of the esters which have been hydrolyzed down as far as the diester. The accompanying drawing consists of a chart indicating the influence of the acetyl and butyryl content of a cellulose acetate butyrate on the melting point of the ester. This chart shows what acetate butyrates and what straight butyrates, if stable, have a melting point below 230° C. and are therefore suitable in our coating method. The graph refers to stable cellulose esters and therefore the char point will be at least 40° above their melting point thus indicating their suitability. It may be seen from the chart that the most highly preferred esters are the higher butyryl esters or the acetate butyrates which are substantially fully esterified (not more than approximately 5% acyl has been hydrolyzed off) and which have an acetyl content of approximately less than 20% the remainder being substantially all butyryl. It is to be understood that the chart is of a general nature and indicates the relative melting points of the ester and should not be regarded as absolute as melting points do not depend solely on acetyl and butyryl contents.

As pointed out above, it is preferred that the compositions employed in our process be free of plasticizer as the esters which we use are of sufficient flexibility and plasticity that no plasticizer is necessary, the presence of plasticizer interfering with the adhesion of the layer to the object, roughly in proportion to the percentage of plasticizer which is present. If plasticizer is employed, 20% is the upper limit, as the effect upon the adhesion of the coating is particularly noticeable above this point. An amount of plasticizer of 50% or more is undesirable as the adhesion is poor with an amount of plasticizer of this order. If plasticizer or, for that matter, any other compound is incorporated, it should be one which is stable at the temperature employed. Needless to say, the cellulose ester which is used should also be a stable product. A stable cellulose ester may be defined as one which will withstand heating for eight hours at 160° C. Any ester, which comes within this qualification which has a melting point below 230° C. and a char point at least 40° C. above its melting point (this indicating stability) may be employed in our process. If the use of a plasticizer is felt to be necessary, one or more of the following may be incorporated in a proportion which will not seriously effect the adhesion (below 50% and preferably not more than 20%): dibutyl sebacate, methyl stearate, triphenyl phosphate and diamyl phthalate.

The presence of resins in compositions, to be employed in our process, is undesirable, as these compounds in any appreciable amount cause brittleness and deteriorate in ultra-violet light. Although the presence of a few per cent (such as up to 3%, the compositions with no more than this being regarded as substantially free of resin) may be tolerated without any serious disadvantage, it is preferred that the composition be completely free of resin. If desired, a small amount of wax, such as up to about 5%, can be incorporated in the composition which we employ. For instance, incorporation of a small amount of paraffin wax will result in increased moisture resistance of the coating. If desired, up to 2% of an anti-oxidant can be incorporated, which might be of advantage in cases where the esters are subjected to an elevated temperature for a long period so that the charring tendencies are lessened.

The coating of an object in accordance with our invention may be carried out as follows:

One part of cellulose acetate butyrate, having a butyryl content of 37.5% and an acetyl content of 13%, a melting point of 200° C. and a char point of 295° C., was dissolved in 10 parts of ethylene chloride. A brass cup was dipped in the solution and, upon its withdrawal, the solvent was evaporated from the coating. The cup was then put in an oven, having a temperature of 230° C., for two minutes, the coating becoming soft and pasty. It was removed from the oven and cooled and was found to have a firm, tenacious coating; whereas, before the heat treatment, the coating thereon readily peeled off. Pieces of sheet metal, coated in accordance with our invention, were found to crease and bend readily without any break in the protective coating adhering thereto, which coating was applied in accordance with our invention. Our coating method may be applied to surfaces which have not been prepared for coating, such as those which still contain oil or grease, in small amount. As the oil or grease will not prevent adhesion of the coating to the surface, the only disadvantage, which might be present, would be discoloration of the resulting coating. Our coating method may be applied to the surface of objects of any material, which is not affected by the temperature, which is employed in our process. For instance, metal, wood and glass surfaces are readily coated by our process. Due to the firmness and strength of the coating obtained and the resistance of the coating to ultra-violet light, it is long-lived and serviceable in everyday use.

Instead of the cellulose acetate butyrate, prescribed in the example, a cellulose acetate caproate, having the characteristics specified, might be used. Such an ester is a cellulose acetate caproate having an acetyl content of approximately 25% and a caproyl content of approximately 27%, a melting point of 154° C. and a char point of 265° C. This acetate caproate, when melted on the surface of a sheet of metal, for instance, in accordance with the procedure specified in the example, gives a hard, transparent, firmly adherent coating thereon. In some cases, the hardness of the coating may not be particularly important. In those cases any ester, having a melting point of less than 230° C. and a char point more than 40° C. above its melting point, may be used regardless of the proportion of acyl groups, having more than 10 carbon atoms, which are present.

The preferred coating method involves transparent coatings. If desired a stable coloring material may be incorporated. If the coloring material should be a pigment the coating might not be transparent but rather translucent or even opaque.

The melting temperature should be such that charring will not occur under the conditions of operation. In ordinary practice this is at least 40° C. below the char point of the ester although there may be cases where with extreme care a temperature closer to the char point might be employed. Operation at a melting temperature at least 50° C. below the char point is even more desirable as with a greater span between char point and the temperature of operation, less care is necessary.

The coatings applied in accordance with our invention are especially valuable for electrical insulating purposes due to the uniformity of the coating. If there are any indentations or pinholes in the coating the fusion or melting operation removes these indentations making an even surface which is uniformly resistant to the passage of electricity.

The cellulose esters which are preferred for use in our process are those which are really stable as indicated by their high char point. These esters stabilized by the method described and claimed in Malm and Kirton application Serial No. 254,492, filed Feburary 3, 1939, are particularly adapted for use in our method.

In our process the low viscosity esters are more economical in coating objects in accordance with our invention. For instance the cellulose esters described which have a viscosity of .1–2 secs. (4:1 acetone viscosity) have been found to be particularly suitable for forming coatings on objects in accordance with our invention.

If the use of a plasticizer is desired some types of plasticizers which can be used are:

1. Esters of organic dibasic acids and monohydric alcohols, particularly of the alcohols of at least 4 carbon atoms, such as diamyl phthalate, dibutyl phthalate and bibutyl sebacate.
2. Esters of aliphatic, long-chain fatty acids and mono-hydric alcohols such as methyl or ethyl stearate.
3. Esters of aliphatic long-chain alcohols and mono-basic acids such as cetyl acetate or cetyl propionate.
4. Esters of phosphoric acid and phenols or derivatives of phenols, such as triphenyl phosphate or tricresyl phosphate.
5. Esters of sugars and mono-basic acids such as sucrose octa-acetate or octa-propionate.

These plasticizers are stable, compatible, and of high molecular weight and are suitable for use in our invention in the proportion specified.

We claim:

1. A method of applying a strongly-adhering coating to the surface of an object which is not affected by moderate heat which comprises wetting the surface with a solution in a volatile solvent of a stable substantially fully esterified cellulose acetate butyrate of approximately 5–21% acetyl, the remainder of the acyl being substantially butyryl, containing substantially no plasticizer or resin, evaporating off the solvent, subsequently subjecting the object to a temperature at least 20° C. above the melting point of the ester and at least 50° C. below its char point for approximately two minutes and then cooling the material so that a strongly-adhering, firm, non-tacky coating is formed thereon.

2. A method of applying a strongly-adhering coating to the surface of an object which is not affected by moderate heat which comprises wetting the surface with a solution in a volatile solvent of a stable substantially fully esterified cellulose acetate butyrate of approximately 5–21% acetyl, the remainder of the acyl being substantially butyryl, containing substantially no plasticizer or resin and not more than 5% of wax, evaporating off the solvent and subjecting the object having a layer of the cellulose ester thereon to a temperature at least 20° C. above its melting point and at least 50° C. below its char point for approximately two minutes and cooling the material so that a strongly-adhering, firm, non-tacky coating is formed thereon.

3. A method of applying a strongly-adhering coating to the surface of an object which is not affected by moderate heat, which comprises wetting the surface with a solution in a volatile solvent of a cellulose ester selected from the group consisting of the cellulose acetate butyrates and the cellulose acetate caproates having melting points of less than 230° C. and char points at least 40° C. above their respective melting points, which ester contains 0–20% of plasticizer and is substantially free of resin, evaporating off the solvent and subjecting the object having the cellulose ester layer thereon to a temperature which will melt the ester but which is at least 40° C. below its char point without detrimentally affecting the ester and then cooling the object so that a strongly adhering, firm, non-tacky coating is formed thereon.

4. A method of applying a strongly-adhering coating to the surface of an object which is not affected by moderate heat, which comprises wetting the surface with a solution in a volatile solvent of a cellulose ester selected from the group consisting of the cellulose acetate butyrates and the cellulose acetate caproates having melting points of less than 230° C. and char points at least 40° C. above their respective melting points, which ester contains 0–20% of plasticizer and is substantially free of resin, evaporating off the solvent and subjecting the object having the cellulose ester layer thereon to a melting temperature for the ester which is at least 40° C. below its char point and will not detrimentally affect the ester and then allowing the object to cool so that a strongly-adhering, firm, non-tacky coating is formed thereon.

5. A method of applying a strongly-adhering coating to the surface of an object which is not affected by moderate heat, which comprises wetting the surface with a solution in a volatile solvent of a cellulose acetate butyrate having a melting point of less than 230° C. and a char point at least 40° C. above its melting point, which ester contains 0–20% of plasticizer and is substantially free of resin, evaporating off the solvent and subjecting the object having a layer of the cellulose ester thereon to a temperature which will melt the ester without detrimentally affecting it and then allowing the object to cool so that a strongly-adhering, firm, non-tacky coating is formed thereon.

6. A method of applying a strongly-adhering coating to the surface of an object which is not affected by moderate heat, which comprises wetting the surface with a solution in a volatile solvent of a stable, substantially-fully esterified cellulose acetate butyrate of approximately 5–21% acetyl, the remainder of the acyl being substantially butyryl, which ester contains 0–20% of plasticizer and is substantially free of resin, evaporating off the solvent and subject the object to a temperature which will melt the ester without detrimentally affecting it and then allowing the object to cool so that a strongly-adhering, firm, non-tacky coating is formed thereon.

7. A method of applying a strongly-adhering coating to a smooth surface which is not affected by moderate heat, which comprises wetting the surface with a solution in a volatile solvent of a cellulose ester selected from the group consisting of the cellulose acetate butyrates and the cellulose acetate caproates having melting points of less than 230° C. and char points at least 40° C. above their respective melting points, which ester contains 0–20% of plasticizer and is substantially free of resin, evaporating off the solvent and subjecting the surface having a layer of cellulose ester thereon to a temperature which will melt the ester without detrimentally affecting it and then allowing the coating to cool so that a strongly-adhering, firm, non-tacky coating is formed thereon.

8. A method of applying a strongly-adhering coating to the surface of a metal object which is not affected by moderate heat, which comprises wetting the surface to be coated with a solution in a volatile solvent of a cellulose ester selected from the group consisting of the cellulose acetate butyrates and the cellulose acetate caproates having melting points of less than 230° C. and char points at least 40° C. above their respective melting points, which ester contains 0–20% of plasticizer and is substantially free of resin, evaporating off the solvent and subjecting the object having a layer of the cellulose ester thereon to a temperature which will melt the ester without detrimentally affecting it and then allowing the coating to cool so that a strongly-adhering, firm, non-tacky coating results.

9. A method of applying a strongly-adhering coating to the surface of an object which is not affected by moderate heat, which comprises wetting the surface with a solution in a volatile solvent of a cellulose ester selected from the group consisting of the cellulose acetate butyrates and the cellulose acetate caproates having melting points of less than 230° C. and char points at least 40° C. above their respective melting points, containing substantially no plasticizer or resin, evaporating off the solvent and subjecting the object having the layer of cellulose ester thereon to a temperature which will melt the ester without detrimentally affecting it and then allowing the material to cool so that a strongly-adhering, firm, non-tacky coating is formed thereon.

CARL J. MALM.
GERARD J. CLARKE.